United States Patent [19]

Kolich

[11] 4,241,034

[45] Dec. 23, 1980

[54] PROCESS FOR PURIFYING CYCLIC PHOSPHONITRILIC CHLORIDES

[75] Inventor: Charles H. Kolich, Farmington Hills, Mich.

[73] Assignee: Ethyl Corporation, Richmond, Va.

[21] Appl. No.: 44,309

[22] Filed: May 31, 1979

[51] Int. Cl.$^3$ ............................................. C01B 25/10
[52] U.S. Cl. ...................................................... 423/300
[58] Field of Search ........................................ 423/300

[56] References Cited

U.S. PATENT DOCUMENTS

| | | | |
|---|---|---|---|
| 3,008,799 | 11/1961 | Paddock et al. | 423/300 |
| 3,378,353 | 4/1968 | Hands | 423/300 |
| 3,952,086 | 4/1976 | Fieldhouse | 423/300 |

Primary Examiner—Wayne A. Langel
Attorney, Agent, or Firm—Donald L. Johnson; Joseph D. Odenweller; Willard G. Montgomery

[57] ABSTRACT

A process for improving the purity of phosphonitrilic chloride polymers, namely the trimer and tetramer by (1) contacting a solution of open-chain phosphonitrilic chloride oligomers admixed with cyclic oligomers of phosphonitrilic chloride in a normally liquid hydrocarbon with aqueous lower alkylnitrile, (2) separating the liquid hydrocarbon phase laden with trimer and some tetramer from the aqueous phase thereby produced, and (3) recovering highly purified cyclic trimer and tetramer from the hydrocarbon phase.

35 Claims, No Drawings

PROCESS FOR PURIFYING CYCLIC PHOSPHONITRILIC CHLORIDES

BACKGROUND OF THE INVENTION

Cyclic phosphonitrilic halide, especially the chloride, and particularly the cyclic trimeric and tetrameric phosphonitrilic chloride species are of interest for their use as intermediates for agriculture chemicals, as intermediates for fire retardants, as coatings for ceramics and metals, and in the preparation of polymers having unique glass transition point, solvent resistance, and high and low temperature properties. Of particular interest are polymerized high purity cyclic trimers and tetramers. Hoses, for example, automotive and industrial gaskets, seals, and lubricants are very useful product forms of polymerized high purity chlorophosphazenes. Conventional processes employed for the preparation of phosphonitrilic chlorides or chlorophosphazenes, such as the reaction of phosphorus pentachloride and ammonium chloride, usually produce a mixture of polymers consisting of (a) cyclic phosphonitrilic chloride polymers $(PNCl_2)_n$ where n is an integer of 3 or more and (b) linear or open chain $PNCl_2$ chains end-blocked with the elements of phosphorus pentachloride of the probable formula $(PNCl_2)_n \cdot PCl_5$. Problems have arisen in obtaining the cyclic polymers, particularly the aforementioned trimeric and tetrameric species, relatively free of higher cyclic and linear polymers and in a highly purified form such that the trimeric and tetrameric species can be polymerized into a gel-free benzene or toluene soluble polymer, hereinafter referred to as polygrade material. Although several methods of purification are available, a good degree of purification to date has been difficult, if not impossible to achieve. Specific prior art methods of purification involve the extraction of chlorophosphazene from petroleum ether solutions with sulfuric acid, U.S. Pat. No. 3,008,799; controlled crystallization in variety of solvents, U.S. Pat. No. 3,378,353; separation of the trimer and tetramer from the produced mixtures through distillation involving a spinning band column, U.S. Pat. No. 3,379,510; contacting molten chlorophosphazenes with an inert solvent vapor so as to selectively vaporize the cyclic trimer polymer, separating a solvent vapor phase laden with trimer and some tetramer from the molten polymer residue, condensing it to form a solution of trimer and tetramer in the solvent and subsequently recovering trimer together with some tetramer from the solution, U.S. Pat. No. 3,677,720; steam distillation of chlorophosphazenes resulting in hydrolysis of n=4–9 and hence separation of trimer, Chemical Abstract, volume 77, Page 540, 159648 D (1972) and saponification and hydrolysis of chlorophosphazenes by treatment with aqueous sodium of ammonium hydroxide resulting in unreacted trimer and tetramer, U.S. Pat. No. 3,694,171. Other methods disclosed include separating substantially pure trimer from a mixture comprising tri-(phosphonitrilic chloride) and at least one higher polymer thereof by contacting the mixture with a liquid monohydric alcohol at a temperature and a period of time sufficient to cause the higher polymer to pass into the liquid phase of the alcohol while leaving tri-(phosphonitrilic chloride) in the solid state, U.S. Pat. No. 2,862,799; treating a mixture of phosphonitrillic chloride polymers in an organic solvent at a temperature in the range of 75° C.–100° C. with water so that a major portion of the linear polymers are segregated to an aqueous phase and a major portion of the cyclic polymers are segregated to an organic phase, U.S. Pat. No. 3,669,633; treating a crude mixture of cyclic and linear phosphonitrilic chloride polymers with petroleum ether in which the cyclic polymers are soluble whereas the linear polymers are not, and thereafter the insoluble polymers are separated, after which the polymer solution is separated into a vapor phase of petroleum ether and a solid phase of cyclic polymers of phosphonitrilic chloride, U.S. Pat. No. 3,367,750; and passing a hot inert gas through a molten mixture of crude phosphonitrilic chloride polymers, contacting the thus produced phosphonitrilic polymer-laden gas with an inert solvent to produce a solution of polymers in said inert solvent, and afterward separating the solvent from said solution by conventional means to obtain trimer and tetramer cyclic phosphonitrilic chloride polymers U.S. Pat. No. 3,372,005. U.S. Pat. No. 3,952,086 discloses a process for the purification of crude chlorophosphazene by adding a Bronsted base to a vessel containing crude chlorophosphazene, removing water fromed in the vessel from the reaction of Bronsted base with the impurities in crude chlorophosphazene and then removing at least a very high purity cyclic chlorophosphazene trimer. According to the disclosure, the chlorophosphazene so formed can be polymerized in a gel-free benzene soluble polymer i.e. polygrade material.

SUMMARY OF THE INVENTION

In accordance with the present invention there is provided a process for improving the purity of phosphonitrilic chloride polymers, namely the trimer and tetramer, so that the purified phosphonitrilic chloride polymers can be polymerized into a gel-free benzene or toluene soluble polymer. In general, crude phosphonitrilic chloride is highly purified by removing open-chain phosphonitrilic chloride oligomers from a solution of open-chain oligomers admixed with cyclic oligomers of phosphonitrillic chloride in a normally liquid hydrocarbon by contacting the solution with aqueous lower alkylnitrile and subsequently separating the aqueous phase thereby produced. This process produces highly purified cyclic trimeric and tetrameric phosphonitrilic chloride polymers. No major waste disposal problems are created by the process and no costly reagents are involved.

DESCRIPTION OF PREFERRED EMBODIMENTS

According to the concepts of the present invention highly purified trimer and tetramer are obtained from a mixture of phosphonitrilic chloride polymers comprising a mixture of linear or open-chain oligomers admixed with cyclic trimers, tetramers, and higher cyclic oligomers of phosphonitrilic chloride by dissolving the mixture in a normally liquid aliphatic hydrocarbon to extract a major portion of the cyclic oligomers from the mixture into a hydrocarbon phase, thereafter treating the hydrocarbon phase with aqueous lower alkylnitrile to extract open-chain phosphonitrilic chloride oligomers entrained in the cyclic enriched hydrocarbon phase into a separate aqueous phase, and subsequently recovering highly pure cyclic trimer and tetramer from the hydrocarbon phase. Thus, a preferred embodiment of the present invention is a process for improving the purity of phosphonitrilic chloride polymers which comprises (1) contacting a solution of open-chain phosphonitrilic chloride oligomers admixed with cyclic oligomers of phosphonitrilic chloride in a normally liquid hydrocarbon with aqueous lower alkylnitrile, (2) separating the liquid hydrocarbon phase laden with trimer and some tetramer from the aqueous phase thereby produced, and (3) recovering high purity cyclic trimer and tetramer from the hydrocarbon phase.

In the practice of the present process, the phosphonitrilic chloride mixture is dissolved in an amount of hydrocarbon sufficient to extract a major portion of the cyclic oligomers from the mixture into a hydrocarbon phase and a major portion of the open-chain oligomers into a separate oil phase. Thereafter, the oil phase is removed from the hydrocarbon phase and the hydrocarbon phase is treated with aqueous lower alkylnitrile to extract open-chain phosphonitrilic chloride oligomers entrained in the cyclic enriched hydrocarbon phase into a separate aqueous phase. The aqueous phase is then separated from the hydrocarbon phase and the hydrocarbon phase is water washed to remove entrained alkylnitrile therefrom. The hydrocarbon phase is then dried and the solvent is removed therefrom to yield a cyclic enriched mixture of phosphonitrilic chloride polymers of the formula $(PNCl_2)_n$ where $n=3$ or more. The mixture is then dissolved in an inert organic solvent at a temperature sufficient to effect complete dissolution of the mixture therein whereupon the solution is cooled until a significant amount of highly pure trimer and tetramer crystallize from the solution. Thus, another embodiment of the present invention is a process for improving the purity of phosphonitrilic chloride polymers which comprises the following steps:

1. contacting a mixture of open-chain phosphonitrilic chloride oligomers admixed with cyclic oligomers of phosphonitrilic chloride with a normally liquid aliphatic hydrocarbon in an amount sufficient to extract a major portion of the cyclic oligomers, whereby a normally liquid hydrocarbon phase and a separate oil phase are formed;

2. removing the oil phase from the cyclic enriched hydrocarbon phase;

3. treating the hydrocarbon phase with aqueous lower alkylnitrile in an amount sufficient to extract substantially all of the entrained open-chain oligomers from the hydrocarbon phase into a separate aqueous phase thereby produced;

4. removing the aqueous phase from the hydrocarbon phase;

5. treating the hydrocarbon phase with water in an amount sufficient to extract a major portion of entrained alkylnitrile in the hydrocarbon phase into a separate aqueous phase;

6. removing the aqueous phase from the hydrocarbon phase;

7. drying the hydrocarbon phase;

8. removing the solvent from the hydrocarbon phase to yield a cyclic enriched mixture of phosphonitrilic chloride polymers of the formula $(PNCl_2)_n$ where $n=3$ or more;

9. dissolving the cyclic enriched mixture of phosphonitrilic chloride oligomers in an inert organic solvent at a temperature sufficient to effect complete dissolution of the mixture therein; and 10. cooling the solution until a significant amount of highly purified cyclic trimer and tetramer separate from the solution.

Crude chlorophosphazenes or mixtures of phosphonitrilic chlorides can be obtained by conventional processes such as the reaction of phosphorus pentachloride and ammonium chloride whereby a mixture of polymers is obtained. This mixture consists of (a) cyclic phosphonitrilic chloride polymers $(PNCl_2)_n$, where n is an integer of 3 or more, and (b) linear or open-chain $PNCl_2$ chains end-blocked with the elements of phosphorus pentachloride of the probable formula $(PNCl_2)_nPCl_5$. Typical proportions, expressed as percentages by weight, of the two types of polymer obtained by this method, are 75-95% of the cyclic polymers and 5-25% of the linear polymers of the general formula $(PNCl_2)_nPCl_5$, wherein n is an integer of 2 or more. Typical proportions of the individual cyclic polymers are approximately 50-60% of the trimer $(PNCl_2)_3$, 10-15% of the tetramer $(PNCl_2)_4$ and 25-30% of the higher cyclic polymers; the percentages of the various polymers being expressed as percentages by weight. Yields of the crude mixture are generally of the order of 95-99% based on the $PCl_5$ used. The proportions of the two types of polymers may be varied depending on the particular mode, manner and variables as well known to one skilled in the art. For example, the percentage of trimer in the crude product can be as high as 70% or more. It is not necessary to the practice of the present invention that the crude starting material be obtained by the foregoing process. This is only exemplary of one of the methods available for producing mixtures of phosphonitrilic chlorides. Other methods, such as, for example, the process disclosed in U.S. Pat. No. 3,669,633 may also be used.

The chlorophosphazene crude produced is placed in a vessel or pot. A normally liquid hydrocarbon is then added to the vessel and the crude chlorophosphazenes are slurried in the hydrocarbon. Alternatively, the crude may be added to the hydrocarbon, if preferred, before mixing. The hydrocarbon boiling point should be sufficiently low that the hydrocarbon may be removed afterwards from the chlorophosphazenes without further polymerization. The hydrocarbons are such that alone or with the phosphonitrilic chloride polymers in the reaction system, they have a boiling point in the range of about 30° C. to about 150° C. It is preferred to use heptane as the normally liquid aliphatic hydrocarbon in the invention, although other alkanes may be used. In general, alkanes having from 5 to about 9 carbon atoms may be used. Examples of alkanes other than heptane which may be used in the practice of the present invention include pentane, hexane, cyclohexane, isooctane, nonane, mixtures of these alkanes, and the like. Petroleum ether fractions may also be used.

The crude chlorophosphazenes are treated with an amount of hydrocarbon sufficient to extract a major portion of the cyclic oligomers from the crude chlorophosphazene mixture. The optimum amount of hydrocarbon to be used will depend primarily on the solubility characteristics of the particular hydrocarbon used and the specific composition of the crude starting material. Where heptane is the solvent of choice, it is desirable to use an amount of heptane at least 3 times the weight of the starting crude to insure the extraction of a major portion of the cyclics from the polymer mix. In general, the greater the amount of hydrocarbon used the more complete the extraction of cyclics from the polymer mix. Ordinarily, an amount of about 2.5 to 4 times the weight of the starting crude is conveniently used; and about 3 times the weight of the starting crude is preferred.

The crude chlorophosphazene mixture is treated with the hydrocarbon in such a way as to insure intimate contact between the hydrocarbon and the mixture in order to effect extraction of a major portion of the cyclic oligomers from the mixture. Treatment is at room temperature. After treatment with the hydrocarbon, a two-phase system is obtained. The upper phase contains principally the hydrocarbon and a major portion of cyclic oligomers, consisting primarily of trimers and tetramers, along with some higher cyclics, extracted from the crude chlorophosphazene mixture. The lower phase consists principally of a black oil comprising predominately linear or open-chain phosphonitrilic chloride oligomers.

The cyclic enriched hydrocarbon layer is then separated from the oil layer and washed with a solution of aqueous lower alkylnitrile. Separation is effected by drawing off the lower oil layer consisting predominently of open-chain oligomers derived from the crude chlorophosphazene mixture from the bottom of the vessel leaving the cyclic enriched hydrocarbon layer intact in the vessel. The hydrocarbon layer is then treated with an amount of aqueous lower alkylnitrile sufficient to extract substantially all of the open-chain phosphonitrilic chloride polymers which may have been entrained in the cyclic enriched hydrocarbon phase after initial treatment of the crude chlorophosphazene mixture with the hydrocarbon. The cyclic enriched hydrocarbon layer is treated with the solution of aqueous alkylnitrile in such a way as to insure intimate contact between the two liquids and to effect the extraction of a substantial portion of any open-chain oligomers entrained in the hydrocarbon layer. Preferably, the hydrocarbon layer is transferred to a separate vessel for treatment with the lower alkylnitrile-water wash solution subsequent to the removal of the oil layer from the hydrocarbon layer. This is desirable to avoid the inclusion of any linear species in the cyclic enriched hydrocarbon layer which are normally present in the coating of oil which forms on the inside walls of the vessel as the oil layer is separated from the hydrocarbon layer. Acetonitrile is the preferred lower alkylnitrile used in the practice of the present process. Other lower alkylnitriles such as propionitrile may also be used. After treatment with the aqueous alkylnitrile, a two-phase system is obtained. The upper phase contains principally the hydrocarbon, cyclic phosphonitrilic chloride oligomers extracted from the crude chlorophosphazene mixture and a small quantity of entrained alkylnitrile from the alkylnitrile-water wash solution. A small amount of water may also be present in the hydrocarbon phase. The lower phase contains principally water, alkylnitrile and substantially all of the linear or open chain phosphonitrilic chloride oligomers previously entrained in the hydrocarbon phase prior to the treatment thereof with the solution of aqueous alkylnitrile. The open-chain phosphonitrilic chloride polymers extracted by the alkylnitrile wash undergo hydrolysis with the slow evolution of a gas (thought to be HCl) to form an oily brown solid. The lower alkylnitrile-water wash solution may comprise from about 25 weight percent to do about 90 weight percent lower alkylnitrile based on the total weight of the wash solution. Highly purified cyclic trimer and tetramer is obtained when a concentration of alkylnitrile within this range is used. A preferred wash solution contains about 50 weight percent lower alkylnitrile based on the total weight of the wash solution.

The amount of aqueous lower alkylnitrile wash solution preferred for use in the practice of the present invention is about 20 weight percent based on the weight of the starting crude. However, amounts of as little as 5.0 weight percent may be used. There is really no upper limit on the amount of solution which can be used in the practice of the present process. Thus, maximum amounts of solution used will be determined by practical considerations such as cost, and the like. In general, the higher the concentration of alkylnitrile in the wash solution the smaller the amount of solution necessary to remove the entrained open chain oligomers from the hydrogen phase.

Contact time of the cyclic enriched hydrocarbon layer with the lower alkylnitrile-water wash solution may vary from about 20 minutes to about 4 hours with no loss in purity of the final product. Although phase separation is significantly complete within approximately 20 minutes, a contact time of about one hour has been found desirable to insure complete extraction of substantially all of the open chain oligomers entrained in the hydrocarbon phase to the alkylnitrile-water phase. Normally, only one alkylnitrile-water wash is necessary in the practice of the present invention. However, more than one wash may be used, if desired. Treatment is carried out at room temperature.

Following treatment with aqueous alkylnitrile, the aqueous alkylnitrile phase is separated from the cyclic enriched hydrocarbon phase. Removal of the aqeuous alkylnitrile layer is effected by drawing off the aqueous layer from the bottom of the vessel leaving only the hydrocarbon phase in the vessel. After separation, the cyclic enriched hydrocarbon phase is water washed to remove any entrained alkylnitrile therefrom. If desired, the hydrocarbon phase may be transferred to a separate vessel for washing. The hydrocarbon phase is then dried to remove any traces of water which may be present therein. Normally, only one water wash is necessary to remove entrained alkylnitrile from the hydrocarbon phase although more than one washing may be used if desired. Water washing is conducted at room temperature. Conventional drying agents such as sodium sulfate, calcium sulfate, magnesium sulfate and calcium chloride may be used in the present process. Sodium sulfate is preferred. Alternatively, molecular sieves of the appropriate pore size can be used in the place of the aforementioned drying agents. A Linde-Type 4A molecular sieve having a pore diameter of 4 Angstroms has been found to be particularly suitable for use in the practice of the instant process. In general, only a small amount of drying agent is required. However, an excess amount may be used if desired. An approximate amount of drying agent which has been found useful ranges from about 1% by weight to about 25% by weight based on the total weight of the crude chlorophosphazene starting material. Drying is affected by adding the drying agent of choice to the vessel containing the cyclic enriched hydrocarbon layer and allowing sufficient time for the adsorbent material to act. Normally, from about one hour to about 24 hours is sufficient. The drying agent is then filtered from the hydrocarbon phase. Filtration may be effected by conventional filter aids, such as, for example, a glass frit. Vacuum may be used, if desired, to aid in filtration. Drying is at room temperature. After removal of the drying agent, a clear pale yellow filtrate containing predominately cyclic trimer and tetramer along with other higher cyclic remains.

In prior art methods, activated carbon is frequently employed as a means of improving the color of the final product. For example, in aforementioned U.S. Pat. No. 3,694,171, activated charcoal is added to a chlorophosphazene containing solvent layer which has previously been treated with an aqueous solution of alkali metal hydroxide to improve the color of the final product. One advantage of the present process over prior methods which utilize activated carbon or charcoal is that substantially no difference exists in the color of the final purified product of the present invention and that of prior art products in which activated carbon or charcoal have been used. That is, the process of the present invention produces a clear, colorless, highly pure polygrade product without the use of activated carbon. This is not to say that activated carbon cannot be used in the present process if desired, only that its use is entirely optional and unnecessary. Where treatment with activated carbon is desired, treatment is effected either by adding dry powdered carbon to the filtrate obtained after removal of the drying agent, or, alternatively, by circulating the filtrate through a granular carbon bed. Treatment with activated carbon is continued for approximately 1 to 24 hours at room temperature. A filter aid is then added and the charcoal is filtered off.

Following drying, the clear pale yellow filtrate containing predominately cyclic trimer and tetramer oligomers, optionally treated with activated carbon, is evaporated to dryness. This is accomplished by depositing the cyclic enriched filtrate in an evaporator vessel wherein the temperature is raised and the pressure is lowered below atmospheric so as to remove the solvent from the cyclic polymer product. The solvent may be passed through a condenser as a vapor and therein recovered as a liquid solvent. The cyclic enriched product remains in the vessel as an off-white, somewhat oily solid. Generally, evaporation is effected by slowly heating the vessel from room temperature up to a maximum temperature of approximately 60° C. while simultaneously lowering the pressure from atmospheric to approximately 1 mm of mercury over a period of time of approximately one hour. This combination of temperature and pressure has been found suitable for the removal of solvent down to at least 0.5 weight percent solvent. Other temperatures outside of this range can readily be utilized with different combinations of vacuum as well known to one skilled in the art. The important aspect is to remove the solvent while avoiding a temperature which is so high that volatilization of the desired trimer and tetramer occurs.

After removal of the solvent, the cyclic enriched phosphonitrilic chloride product is dissolved in an inert organic solvlent at a temperature sufficient to effect complete dissolution of the product in the solvent and at a concentration which permits the recovery of a significant proportion of highly purified cyclic trimer and tetramer from the solution. The solution is then cooled until a significant amount of the trimer and tetramer crystallize from the solution. Only a portion of the trimer and tretramer crystallizes out in the process of the invention. Usually, slightly less than 60% but substantially more than 30% of the crude starting material is recovered from the solution as highly pure trimer and tetramer. Normally, a yield of approximately 45% is consistently obtained. The remaining trimer and tetramer stay in solution (i.e. in the mother liquor) along with higher cyclics and other impurities. The mother liquor can be combined with fresh starting material, i.e. crude chlorophosphazenes, and recycled so that a maximum amount of purified trimer and tetramer can be isolated or obtained from the crude starting material. Organic solvents preferred for use in crystallization can be the same normally liquid aliphatic hydrocarbons used for treating the starting crude chlorophosphazene mixture in the initial step of the present process. Of these, heptane is the most preferred hydrocarbon, however, any of the other disclosed alkanes having from 5 to 9 carbon atoms may also be used. For convenience, the same solvent is normally used in both steps. However, it is not necessary that the particular solvent used for crystallization be the same as that used for extracting cyclics from the crude mixture in the first step of the process. Further, solvents other than the aforementioned alkanes can be satisfactorily used in the crystallization step of the present process. For example, chlorinated hydrocarbon solvents such as monochlorobenzene, trichlorobenzenes, orthodichlorobenzene, carbon tetrachloride, chloroform, methylene chloride, symtetrachloroethane, and tetrachoroethylene may be used. Dioxane, benzene, tetrahydrofuran, toluene and xylene also may be used as well. The amount of solvent used is an amount sufficient to yield a solution containing from about 20 weight percent to about 70 weight percent cyclic enriched chlorophosphazene based on the total weight of the solution. Normally, the greater the amount of solvent used, the less the amount of trimer and tetramer which crystallize from the solution. A particularly advantageous mixture is one of solvent and about an equal weight of cyclic enriched product.

The temperature at which the cyclic enriched product is dissolved in the solvent is not critical provided complete dissolution is effected. Temperatures of from about 60° C. to about 70° C. are suitable. As the solution is cooled, a point is reached, depending on the particular solvent used, at which purified chlorophosphazenes begin to crystallize from the solution. As cooling continues, more and more cyclic trimer and tetramer crystallize from the solution. The rate of cooling is not critical. Cooling rates of approximately 1° C. to approximately 0.05° C. per minute are suitable. In general, continued lowering of the temperature below the temperature at which crystallization begins produces greater yield of product. In the present process, for example, a cyclic enriched 50 weight percent heptane solution cooled to approximately 25° C. produced a yield of about 40% purified chlorophosphazene. Continued cooling to 0° C., however, increased the yield of polygrade product to approximately 60%. After cooling, filtration of purified trimer and tetramer is carried out using any of the conventional type means of filtration such as, for example, centrifugation, or by use of a glass frit with or without vacuum. After filtration, the crystalline, highly pure cyclic trimer and tetramer is washed with fresh solvent and dried on a rotary evaporator in accordance with the aforedescribed procedure.

As mentioned previously, the efficiency of the present invention can be optimized by recycling the mother liquor containing trimer and tetramer which did not separate from solution during crystallization to obtain a maximum yield of purified trimer and tetramer. Recycle is accomplished by adding to the mother liquor containing trimer and tetramer, along with other higher cyclics, a sufficient amount of fresh crude chlorophosphazene to restore the weight of the starting material to its original amount. This starting material, consisting of mother liquor and combined fresh crude chlorophosphazene, is then diluted to the original concentration with the same hydrocarbon contained in the mother liquor and the above steps of the process are repeated. After one or more cycles, however, the amount of trimer and tetramer in the mother liquor steadily decreases thereby causing a build-up of higher undesirable cyclics during recycle. In general, the overall yield for recycle (based on one series of 3 separate rerecycles and one series of 2 separate recycles) is about the same as the highest yield obtained in a single run where crystallization was carried out from a 50 weight percent heptane solution at 0° C.

Optionally, the drying step utilizing conventional drying agents such as sodium sulfate can be eliminated by immediately distilling the organic solvent from the water-washed cyclic enriched solvent solution to azeotropically remove therefrom water and traces of alkylnitrile in the form of a ternary alkylnitrile-water-solvent azeotrope. Distillation is carried out in the following manner. The cyclic enriched layer is separated from the aqueous phase after washing and transferred to a distillation vessel where solvent is refluxed through a simple distillation column (such as a Vigreux Column). Distillate is collected in a receiver until the temperature of the vapor reaches the boiling point of the pure solvent. The distillation can be carried out at atmospheric, subatmospheric or superatmospheric pressure. It is generally necessary to remove from about 10 weight percent to about 20 weight percent of the solvent as distillate to completely dry the hydrocarbon phase. It is convenient in plant scale operations to continue solvent distillation in this manner until the chlorophosphazene/solvent ratio desired for crystallization is achieved. However, in laboratory scale work where complete solvent removal is desired to determine the exact chlorophosphazene weight, the distillation is more conveniently completed using a rotary evaporator. Complete removal of solvent can be accomplished in a rotary evaporator in 30 minutes or less by slightly reducing the pressure from atmospheric to approximately 1 mm of mercury while simultaneously increasing the temperature of the solution from ambient to approximately 60° C. A weighed quantity of fresh solvent or a fraction of the solvent distillate can be added to the solid chlorophosphazene to give the desired concentration for crystallization.

The resultant cyclic trimers and tetramers produced by the process of the present invention are of extremely high purity and can be polymerized into gel-free benzene or toluene soluble polymers. In the present process, a sample is sealed in an evacuated tube and is heated at 270° C. until the molten liquid ceases to flow. Polymerization is then continued for an additional time equal to the time required to attain a non-flowing state. After cooling, the sample is extracted with heptane to remove oligomers. The chlorophosphazene polymer is dried under vacuum and then dissolved in sufficient toluene to give a solution containing 4 grams of polymer per 100 ml of toluene. The solution is filtered to remove gel, and diluted with toluene to the proper viscosity range. The viscosity of the diluted solution (DSV) is measured at 25° C. Gel, if present, is dried and weighed. For acceptable product, conversion to high polymer must be 40% or greater, gel formation must be less than 2 weight percent based on the weight of polymer, and the inherent viscosity at 25° C. (measured using a solution containing 4.0 weight/volume percent polymerized sample diluted to the optimum viscosity range) must be within the range of 1.1 to 3.0 dl/g.

The present invention will be still further apparent from the following examples. These examples are merely intended to illustrate the practice of this invention and are not intended to limit the same. In the following examples, a crude chlorophosphazene mixture having either one of the two following compositions (designated A and B) was used as starting material. All percentages are by weight. Analyses were by Gas Phase Chromatography.

|  | Composition A | Composition B |
| --- | --- | --- |
| Trimer | 67.0 | 69.0 |
| Tetramer | 12.2 | 12.8 |
| Pentamer | 5.2 | 5.1 |
| Hexamer | 1.9 | 1.8 |
| Heptamer | 0.5 | 0.0 |
| Higher cyclics, linears, unknowns | 11.5 | 8.9 |

EXAMPLE 1

A 427.6 gram sample of a 25.0 weight percent heptane solution of Composition B crude (106.9 grams) was placed in a 1-liter separatory funnel along with a solution comprising 19.26 grams of acetonitrile and 2.14 grams of water. The mixture was shaken for 2-3 minutes and then allowed to stand for 45 minutes. Phase separation was excellent. The amber lower acetonitrile phase weighed 17.4 grams. The upper pale yellow heptane phase was washed with 50.0 grams of water. Phase separation was again excellent. A very small rag fraction readily separated with the addition of a few crystals of anhydrous $Na_2SO_4$. The lower colorless aqueous phase weighed 56.4 grams. The cloudy heptane phase (423.7 grams) was dried over 5.0 grams of anhydrous $Na_2SO_4$ overnight.

The drying agent was filtered off and washed with fresh heptane. The clear filtrate and washings were stripped to dryness on a rotary evaporator to give 99.3 grams of solid cyclic enriched chlorophosphazene. The solid was dissolved in an equal weight of warm heptane to give a clear, pale yellow solution. Small white crystals of highly purified trimer and tetramer formed upon cooling to room temperature with constant agitation. The mixture was filtered at ambient temperature and the crystals were washed with cold heptane (about $-20°$ C.; 50 milliliters). After vacuum drying analysis of the product on a percentage weight basis showed 93.7% trimer and 3.9% tetramer. The weight of the final product was 46.9 grams. Yield was 43.9% based on the weight of the starting crude. Viscosity (dl/g)=2.5. The combined filtrate and washings were stored under nitrogen in a stoppered flask for recycle at a later time.

EXAMPLE 2

A 1257.0 gram sample of a 25.0 weight percent heptane solution of Composition B crude (314.3 grams) was placed in a 2-liter separatory funnel along with 56.70 grams of acetonitrile and 6.3 grams of water. The mixture was shaken for one minute and then allowed to stand for 60 minutes. The amber lower acetonitrile phase weighed 48.0 grams. The upper pale yellow heptane phase was washed with 157.0 grams of water. The lower colorless aqueous phase weighed 174.5 grams. The cloudy heptane phase was dried over 14.5 grams of anhydrous $Na_2SO_4$ for one hour.

The drying agent was filtered off and washed with fresh heptane. The clear filtrate and washings were stripped to dryness on a rotary evaporator to give 291.2 grams of solid cyclic enriched chlorophosphazene. The solid was redissolved in an equal weight of warm heptane to give a clear, pale yellow solution. Some white crystals of highly purified trimer formed upon cooling to room temperature with constant agitation. The mixture was filtered at ambient temperature, and the crystals were washed with cold heptane. After vacuum drying, analysis of the product on a weight basis showed 101.1% trimer. The product weighed 111.7 grams. Yield, based on the total weight of the starting material, was 35.6%. Visocosity (dl/g)=3.2. The combined filtrate and washings were stored under nitrogen in a stopperd flask for later recycle.

EXAMPLE 3

A 935.0 gram sample of a 25.0 weight percent heptane solution of Composition B crude (233.8 grams) was placed in a 2-liter separatory funnel along with a solution containing 42.3 grams of acetonitrile and 4.70 grams of water. The mixture was shaken got 2–3 minutes and then allowed to stand for 45 minutes. The amber lower acetonitrile phase weighed 36.4 grams. The upper pale yellow heptane phase was washed with 117.0 grams of water. The lower colorless aqueous phase and a small rag layer weighed 135.2 grams. The cloudy heptane phase was dried over 10.8 grams of anhydrous $Na_2SO_4$ for one hour.

The drying agent was filtered off and washed with fresh heptane. The clear filtrate and washings were stripped to dryness on a rotary evaporator to give 223.3 grams of solid cyclic enriched chlorophosphazene. The solid was redissolved in an equal weight of warm heptane to give a clear, pale yellow solution. Small white crystals of purified trimer and tetramer formed upon cooling to room temperature with constant agitation. The mixture was filtered at ambient temperature and the crystals were washed with cold heptane. After vacuum drying analysis of the final product showed 98.3% trimer and 0.3% tetramer. Weight of the final product was 90.9 grams. Yield was 38.8% based on the weight of the starting crude. Viscosity (dl/g)=2.3.

EXAMPLE 4

An 807.6 gram sample of a 25.0 weight percent heptane solution of Composition B crude (201.9 grams) was shaken 2 minutes with a solution containing 36.35 grams of acetonitrile and 4.03 grams of water in a 2-liter separatory funnel. After 20 minutes, the lower amber acetonitrile phase (32.13 grams) was removed. The heptane solution was then shaken 2 minutes with 100.95 grams of distilled water. A small amount of anhydrous $Na_2SO_4$ was added to break a small rag layer. After 2 hours and 20 minutes, the lower aqueous phase weighing 113.17 grams was removed. The pale yellow, hazy heptane solution weighing 798.1 grams was dried over 10 grams of anhydrous $Na_2SO_4$ for one hour and then filtered through a medium porosity glass frit. After washing the drying agent with fresh heptane, the combined pale yellow, clear filtrate and washings weighed 847.8 grams.

The clear heptane solution became cloudy overnight. A thin coat of white solid formed on the flask wall. After filtering a second time and heptane washing, the clear filtrate weighed 867.5 grams. The solution was stripped to dryness on a rotary evaporator to give 187.0 grams of a pale yellow solid comprising 72.7% trimer, 13.4% tetramer and 5.5% pentamer. The solid was dissolved in an equal weight of hot heptane and crystallized at 0° C. After filtration and washing with 50 milliliters of cold heptane (approximately −20° C.) the damp solid weighed 124.7 grams. After vacuum drying analysis of the final product on a weight basis showed 90.3% trimer and 11.4% tetramer. The final product weighed 118.3 grams. Yield was 58.6% based on the weight of the starting crude. Viscosity (dl/g)=1.7. Analysis of the mother liquor and washings on a weight basis showed 46.7% trimer, 11.6% tetramer, 11.2% pentamer and 3.3% hexamer. The combined mother liquor and washings weighed 306.6 grams.

EXAMPLE 5

A 507.8 gram sample of a 25.0 weight percent heptane solution of Composition A crude (127.5 grams) was washed with a solution containing 23.4 grams of acetonitrile and 2.6 grams of water. The lower acetonitrile phase weighed 20.3 grams. The heptane phase was then washed with 64.0 grams water. The colorless aqueous phase and a small rag layer weighing 75.5 grams were removed. The cloudy pale yellow heptane phase was dried over 6.4 grams of anhydrous $Na_2SO_4$ for one hour. The mixture was filtered and the solid was heptane washed to give a clear pale yellow filtrate. The combined filtrate and washings were stripped to dryness on a rotary evaporator to give 118.0 grams of cyclic enriched chlorophosphazene. The solid was crystallized from an equal weight of heptane at room temperature. The crystallized solid was filtered off and washed with cold heptane (approximately −20° C.). Analysis of the vacuum dried product showed 92.6% trimer and 5.3% tetramer. Yield was 41.0%. Viscosity (dl/g)=3.0. The final product weighed 52.3 grams.

In the following examples, the mother liquors from Examples 1 and 2 were recycled in an attempt to isolate or recover a maximum amount of polygrade trimer and tetramer from the starting crude. Two series of runs were made. The first series involved 3 runs or recycles. The second series consisted of 2 runs or recycles. All 5 recycle runs gave excellent polygrade product. However, a buildup of higher cyclic species caused a steady decrease in the amount of purified trimer and tetramer product isolated from each run. Overall yield for the 3 recycle series was approximately 58%. That for the 2 recycle series was approximately 55%.

For both series of runs, fresh Composition B crude and mother liquor were combined and then diluted to the original concentration with the same hydrocarbon in the mother liquor. This combined mixture in heptane was (1) washed with 20 weight percent of a solution (based on the total weight of the chlorophosphazene) comprising 90% acetonitrile and 10 percent water by weight (2) washed with 50 weight percent water (based on the total weight of the chlorophosphazene) and (3) dried over 5 weight percent $Na_2SO_4$ for one hour. Cyclic chlorophosphazene trimer and tetramer were crystallized from a 50 weight percent heptane solution at 25° C. The yield of polygrade product after 3 runs in the first series was slightly under 60% based on the weight of the total added crude. Final product from each of the 3 runs contained only trimer and tetramer: 69.4% trimer and 28.9% tetramer in the first run; 86.9% trimer and 12.0% tetramer in the second run, and 95.0% trimer and 1.7% tetramer in the third run. The yield of polygrade product after two runs in the second series was approximately 55% based on the weight of the total added crude. Analysis of the product on a weight basis after the first run showed 81.2% trimer, 16.17% tetramer and 0.1% pentamer. The final product obtained from the second run showed 87.1% trimer and 11.5% tetramer by weight.

EXAMPLE 6

For the 3 run recycle series, a 209.6 gram solution of mother liquor containing 52.4 grams of predominately cyclic chlorophosphazene recovered from Example 1 was combined in a 1-liter separatory funnel with a 218.0 gram sample of a 25.0 weight percent heptane solution of fresh Composition B crude (54.5 grams). The solution was shaken for 2–3 minutes with a solution containing 19.26 grams of acetonitrile and 2.14 grams of water. The lower light yellow acetonitrile phase (15.6 grams) separated rapidly and cleanly. The heptane fraction was then washed with 49.8 grams of water. A few crystals of $Na_2SO_4$ were required to break a very small rag layer. The lower colorless aqueous phase weighed 56.0 grams. The cloudy pale yellow heptane phase weighing 423.9 grams was stirred with 5.0 grams of anhydrous $Na_2SO_4$ for one hour. The mixture was then filtered through a fine glass frit to give a clear pale yellow filtrate. After washing the solid $Na_2SO_4$ with fresh heptane, the combined filtrate and washes were stripped to dryness on a rotary evaporator to give 101.0 grams of cyclic enriched chlorophosphazene. Crystallization of the solid from an equal weight of heptane at ambient temperature gave 46.8 grams of a heptane washed ($-20°$ C.; 50 milliliters), and vacuum dried product. Analysis on a weight basis showed 69.4% trimer and 28.9% tetramer. The yield was 43.8%. Viscosity (dl/g)=2.5.

A 240.4 gram solution of the filtrate and washings comprising 54.2 grams of predominately cyclic chlorophosphazene and 210.8 grams of 25.0 weight percent heptane solution of fresh Composition B crude (52.7 grams) was then washed with a solution containing 19.26 grams of acetonitrile and 2.14 grams of water. The lower acetonitrile phase weighed 14.3 grams. The heptane phase was then washed with 50.2 grams of water. After adding a few crystals of $Na_2SO_4$ to break a small rag layer, the colorless aqueous phase weighing 56.6 grams was removed. The cloudy pale yellow heptane phase (449.3 grams) was dried over 5.0 grams anhydrous $Na_2SO_4$ for one hour. The mixture was filtered and the solid was heptane washed to give a clear pale yellow filtrate. The combined filtrate and washings were stripped to dryness on a rotary evaporator to give 100.8 grams of cyclic enriched chlorophosphazene. The cyclic enriched solid was crystallized from an equal weight of heptane at room temperature to give a product of highly purified trimer and tetramer polymer. The purified trimer and tetramer was filtered off and washed with 50 milliliters of cold heptane (approximately $-20°$ C.). The vacuum dried product weighed 34.3 grams. Analysis on a weight basis showed 86.9% trimer and 12.0% tetramer. Yield was 32.1%. Viscosity (dl/g)=2.4. The mother liquor and washings weighed 189.9 grams and contained 66.5 grams of predominately cyclic chlorophosphazene.

The 189.9 gram solution of mother liquor and washings remaining after crystallization was combined with a 134.0 gram sample of 25.0 weight percent heptane solution of Composition B crude (33.5 grams). The heptane solution was washed with a solution containing 19.26 grams of acetonitrile and 2.14 grams of water in a 1-liter separatory funnel. The lower yellow acetonitrile phase weighing 15.4 grams was separated after 2 hours. A small amount of white solid was removed with the acetonitrile phase. The heptane solution was then washed with 50.0 grams of water. The hazy colorless lower aqueous phase weighing 56.5 grams was separated after one hour. The cloudy pale yellow heptane layer (320.5 grams) dried over 5.0 grams of anhydrous $Na_2SO_4$ overnight.

The dried heptane solution was filtered through a medium glass frit, and the drying agent was washed with fresh heptane. A 1.5 gram sample of the slightly cloudy filtrate (345.1 grams) was stripped of solvent. Analysis showed 56.5% trimer, 15.0% tetramer, 13.1% pentamer, 4.7% hexamer and 1.7% heptamer. The remaining filtrate was evaporated to dryness on a rotary evaporator to give 97.2 grams of a pale yellow oily solid of cyclic enriched chlorophosphazene. The solid was dissolved in an equal weight of hot heptane and crystallized at ambient temperature to give crystals of highly purified trimer and tetramer. The crystals were filtered after 3 hours standing at room temperature and washed with 50 milliliters of of cold heptane (approximately $-20°$ C.). Analysis of the vacuum dried crystals (17.5 grams) on a weight basis showed 95.0% trimer and 1.7% tetramer. Yield was 17.5%. Viscosity (dl/g)=2.4. The mother liquor and washings weighed 210.7 grams. A 3.3 gram sample of the mother liquor and washings was stripped of solvent and submitted for analysis. Analysis showed 49.0% trimer, 17.6% tetramer, 16.6% pentamer, and 5.7% hexamer.

EXAMPLE 7

For the two run recycle series, a 718 gram solution of mother liquor containing 179.5 grams of predominately cyclic chlorophosphazene obtained from Example 2 was combined in a 2-liter separatory funnel with a 538.0 gram sample of 25.0 weight percent heptane solution of fresh Composition B crude (134.5 gram). The solution was shaken for 2 minutes with a solution containing 56.7 grams of acetonitrile and 6.3 grams of water. The lower yellow acetonitrile phase weighing 37.5 grams separated rapidly and cleanly. The heptane fraction was then washed with 157 grams of water. The lower colorless aqueous phase weighed 183.5 grams. The cloudy pale yellow heptane phase was stirred with 14.5 grams of anhydrous $Na_2SO_4$ for one hour. The mixture was then filtered through a fine glass frit to give a clear pale yellow filtrate. After washing the solid $Na_2SO_4$ with fresh heptane, the combined filtrate and washings were stripped to dryness on a rotary evaporator to give 294.5 grams of a cyclic enriched chlorophosphazene solid. Crystallization of the solid from an equal weight of heptane at ambient temperature gave 113.2 grams (36.1% yield) of heptane washed ($-20°$ C.; 25 Milliliters) and vacuum dried product. Viscosity (dl/g)=2.4. Analysis of the product showed 81.2% trimer, 16.1% tetramer and 0.1% pentamer. The filtrate and washings weighed 725 grams and contained 181.3 grams of predominately cyclic chlorophosphazene.

The 725 gram solution of filtrate and washings remaining after crystallization was combined with a 530.8 gram sample of a 25.0 weight percent heptane solution of fresh Composition B crude (132.7 grams) and washed with a solution containing 56.7 grams of acetonitrile and 6.3 grams of water. The lower acetonitrile phase weighed 41.0 grams. The heptane phase was then washed with 157 grams of water. The colorless aqueous phase weighing 174 grams was removed. The cloudy mixture was filtered and the solid was heptane washed to give a clear pale yellow filtrate. The combined filtrate and washings were stripped to dryness on a rotary evaporator to give 295.2 grams of cyclic enriched chlorophosphazene. The solid was crystallized from an equal weight of heptane at room temperature to give highly purified trimer and tetramer chlorophosphazene. The crystallized solid was filtered off and washed with cold heptane (approximately −20° C.). Analysis of the vacuum dried product showed 87.1% trimer and 11.5% tetramer. The final product weighed 94.0 grams. Yield was 29.9%. Viscosity (dl/g=2.6. The mother liquor and washings contained 201.2 grams of predominately cyclic chlorophosphazene.

Optionally, activated carbon may be added to the filtrate after drying. However, one advantage of the present process is that colorless polygrade material is produced without the use of activated carbon. Thus, the use of activated carbon is entirely optional. The following example demonstrates that activated carbon may be employed in the present process.

EXAMPLE 8

A 416.7 gram sample of a 25.5 weight percent heptane solution of Composition B crude (106.2 grams) was shaken in a 1-liter separatory funnel with a solution containing 17.54 grams of acetonitrile and 2.06 grams of water. The lower amber acetonitrile phase weighing 16.2 grams was removed, and a second wash with 19.17 grams of acetonitrile and 2.13 grams of water was carried out. Separation was slow and clean. The cloudy colorless acetonitrile phase weighed 23.7 grams. The cloudy pale yellow heptane solution was then washed with 50.8 grams of water. The cloudy colorless aqueous layer weighing 57.3 grams was removed and a second wash with 49.5 grams of water was carried out. A large rag layer was broken by adding a small amount of anhydrous $Na_2SO_4$. The lower, clear, colorless aqueous phase weighing 55.1 grams was removed. The cloudy heptane phase weighing 404.9 grams was dried over 20.0 grams of anhydrous $Na_2SO_4$ overnight. The combined acetonitrile phase was stripped to dryness on a rotary evaporator to give 7.4 grams of an oily tan solid that slowly evolved a gas.

The drying agent was filtered from the heptane solution, and the solid was washed with fresh heptane. The clear pale yellow filtrate (and washings) were stirred with 0.92 grams of dry Nuchar powdered carbon. After three hours, the mixture was filtered through a Celite bed and the carbon was washed with fresh heptane. The colorless filtrate and washings were evaporated to dryness on a rotary evaporator by slowly raising the temperature from ambient to a maximum of about 60° C. while lowering the pressure from 1 atmosphere to about 1 mm mercury over a period of approximately one hour to give 95.0 grams of white crystalline solid. The solid was dissolved in 95.0 g hot heptane, and the solid was crystallized over the weekend at ambient temperature.

The purified chlorophosphazene-heptane slurry was filtered, and the crystalline trimer and tetramer were washed with 50 milliliters of cold heptane (−20° C.). The damp crystals weighing 52.2 grams were then dried on a rotary evaporator according to the aforedescribed procedure to give 51.2 grams of product. Viscosity (dl/g)=2.7. Analysis of the product on a weight basis showed 88.8% trimer and 8.9% tetramer. The mother liquor and washings weighed 158.1 grams. Evaporation of the solvent gave 44.0 grams of predominantely cyclic chlorophosphazene.

The following example shows that the presence of lower alkylnitrile is critical to the practice of the present process. In the following example, a solution of the phosphonitrilic chloride polymers in a hydrocarbon solvent was washed with an aqueous solution only. No lower alkylnitrile was present in the solution. Gelation occurred when polymerization of the resultant product was attempted.

EXAMPLE 9

A 400 gram sample of a 25.0 weight percent heptane solution of Composition B crude was washed 3 times with 50.0 gram portions of water. The weights of the recovered aqueous phases were 49.8 grams, 49.6 grams, and 52.0 grams, respectively. The heptane phase was then dried over anhydrous $Na_2SO_4$ for one hour. The drying agent was filtered from the heptane solution and evaporated to dryness on a rotary evaporator to give 97.6 grams of crystalline solid. The solid was then crystallized from an equal weight of heptane at ambient temperature to give 39.3 grams (39.3% yield) of trimer and tetramer product after drying on a rotary evaporator. Analysis of the product on a weight basis showed 93.9% trimer and 3.4% tetramer. Attempted polymerization of the product failed producing a gel.

The following example demonstrates that contact of entrained acetonitrile with the cyclic enriched hydrocarbon phase for a period of time slightly in excess of 26 hours does not affect the purity of polygrade material obtained by the process of the present invention. In a later example, in which solvent was removed by distillation, contact time was increased to approximately 60 hours with no resultant loss of purity in the final polygrade product.

EXAMPLE 10

An 804.6 gram sample of a 24.9 weight percent heptane solution of Composition A crude (200.3 grams) was extracted with a solution containing 36.05 grams of acetonitrile and 4.0 grams of water. The amber lower phase weighing 32.05 grams was removed after settling for 60 minutes. The heptane phase was then washed with 100.0 grams of water and after 40 minutes a colorless lower aqueous phase weighing 113.8 grams was removed. The cloudy pale yellow heptane phase was split into Batch A which weighed 400.1 grams and Batch B which weighed 395.8 grams. Batch A was dried over 5.0 grams of anhydrous $Na_2SO_4$ for one hour, filtered, and the filtrate stripped to dryness to give 99.4 grams of cyclic enriched chlorophosphazene (maximum contact time with acetonitrile was 3.5 hours). The solid was crystallized from an equal weight of heptane at ambient temperature to give 40.5 grams (40.2% yield) of highly purified trimer and tetramer product. Viscosity (dl/g)=2.6. Batch B was stirred over 5.0 grams of anhydrous $Na_2SO_4$ for one hour and then allowed to stand overnight. The mixture was filtered and the filtrate stripped to dryness on a rotary evaporator to give 92.7 grams of cyclic enriched chlorophosphazene (maximum contact time with acetonitrile was 26.5 hours). The solid was crystallized from an equal weight of heptane at ambient temperature to given 46.4 grams (46.6% yield) of purified trimer and tetramer product. Viscosity (dl/g)=2.4.

Optionally, the use of conventional drying agents such as sodium sulfate can be eliminated in the practice of the present by immediately distilling the organic solvent from the water washed cyclic enriched hydrocarbon solution to azeotropically remove therefrom water and traces of acetonitrile in the form of a ternary acetonitrile-water-solvent azeotrope. Thus, a further embodiment of the present invention is a process for improving the purity of phosphonitrilic chloride polymers which comprises the following steps:

1. contact a mixture of open-chain phosphonitrilic chloride oligomers admixed with cyclic oligomers of phosphonitrilic chloride with a normally liquid aliphatic hydrocarbon in an amount sufficient to extract a major portion of the cyclic oligomers, whereby a normally liquid hydrocarbon phase and a separate oil phase are formed;
2. removing the oil phase from the cyclic enriched hydrocarbon phase;
3. treating the hydrocarbon phase with a solution of aqueous lower alkylnitrile in an amount sufficient to extract substantially all of the entrained open-chain oligomers from the hydrocarbon phase into a separate aqueous phase thereby produced;
4. removing the aqueous phase from the hydrocarbon phase;
5. treating the hydrocarbon phase with water in an amount sufficient to extract a major portion of entrained alkylnitrile in the hydrocarbon phase into a separate aqueous phase;
6. separating the aqueous phase from the hydrocarbon phase;
7. removing the solvent from the hydrocarbon phase by distillation to yield a cyclic enriched mixture of phosphonitrilic chloride polymers of the formula $(PNCl_2)$ where $n=3$ or more;
8. dissolving the cyclic enriched mixture of phosphonitrilic chloride polymers in an inert organic solvent at a temperature sufficient to effect complete dissolution of the mixture therein;
9. cooling the solution until a significant amount of highly pure cyclic trimers and tetramers separate from the solution.

The following examples illustrate the removal of solvent by distillation. In the laboratory distillation is completed using a rotary evaporator in order to determine the exact chlorophosphazene weight. However, for plant scale operation distillation would continue until the desired chlorophosphazene/solvent ratio for crystallization is achieved. In general, distillution is carried out at temperatures ranging from about 25° C. to about 50° C. at a pressure of from about 100 mm. mercury to about 1.0 mm. mercury.

EXAMPLE 11

A 416.3 gram sample of a 24.89 weight percent heptane solution of Composition A crude (103.6 grams) was shaken for 2 minutes with 20.72 grams of a solution containing 50 weight percent acetonitrile and 50 weight percent water. After standing for 15 minutes, 17.97 grams grams of the lower acetonitrile phase was removed. Final phase separation was completed one hour after adding the acetonitrile-water solution with a total of 19.52 grams of the acetonitrile phase recovered. The heptane phase was then shaken 2 minutes with two portions of water (51.81 grams each). The recovered aqueous phases weighed 55.24 grams and 53.5 grams, respectively. The slightly cloudy heptane phase weighing 410.5 grams was dried by distilling off 53.7 grams of solvent over 45 minutes using an 8-inch Vigreux Column (45° C. maximum bath temperature; 34° C. maximum vapor temperature; 74 millimeters mercury). The maximum contact time of entrained acetonitrile in the hydrocarbon phase was 3.5 hours. The cloudy solution remaining in the distillation pot was filtered through a medium porosity glass frit. The filter was given a heptane wash. The combined clear nearly colorless filtrate and washings weighed 395.4 grams. The solution was stripped to dryness on a rotary evaporator to give 98.4 grams (95% recovery) of cyclic enriched chlorophosphazene. The solid was dissolved in 98.4 grams of hot heptane and allowed to cool overnight. The white crystalline product was filtered, washed with 50 milliliters of cold (approximately −20° C.) heptane and vacuum dried to give a final polygrade product weighing 48.9 grams. Analysis of the product showed on a weight basis 86.5% trimer and 12.5% tetramer. Yield was 46.9%. Viscosity (dl/g)=2.4.

EXAMPLE 12

A 512.0 gram sample of 24.9 weight percent heptane solution of Composition A crude (127.5 grams) was extracted with a solution containing 22.95 grams of acetonitrile and 2.55 grams of water. After settling for one hour the lower phase (20.0 grams) was removed. The heptane phase was then washed 3 times with 64.0 gram portions of water. The weights of the recovered aqueous phases were 70.5 grams, 76.0 grams and 74.0 grams, respectively. The cyclic enriched heptane solution was then distilled at 25 millimeters mercury using an 8-inch Vigreux Column with a final pot temperature reaching 50° C. About 20 weight percent (89.2 grams) of the charge was distilled and then fresh heptane was added to give a 25 weight percent solution. This cloudy solution was filtered through a medium porosity glass fritted funnel. The clear filtrate was stripped to a ratio of 1:1 chlorophosphazene-heptane on a rotary evaporator and the product was crystallized at 25° C. The white crystalline solid weighed 58.2 grams after vacuum drying. Analysis on a weight basis showed 90.1% trimer and 11.1% tetramer. Yield was 45.7%. Viscosity (dl/g)=2.4.

EXAMPLE 13

A 431.0 gram sample of a 24.8 weight percent heptane solution of Composition A crude (107.3 grams) was washed with a solution containing 19.8 grams of acetonitrile and 2.2 grams of water, and 17.5 grams of the acetonitrile phase was recovered after 30 minutes. The heptane phase was then washed 3 times, each time with 50.0 grams of water. The recovered aqueous layers weighed 54.5 grams, 54.5 grams, 50.5 grams, respectively. The heptane solution was dried by distilling off 51.0 grams of solvent through a 8-inch Vigreux Column (37° C. bath temperature; 46 millimeters mercury). After diluting with 51.0 grams of fresh heptane, the cyclic enriched solution was filtered and the clear filtrate was stripped to a weight ratio of 1:1 chlorophosphazene/heptane on a rotary evaporator. Crystallization of the solid at 25° C. from heptane gave 53.3 grams of polygrade product. Analysis on a weight basis showed 85.3% trimer, 13.9% tetramer and 0.2% pentamer. Yield was 49.7%. Viscosity (dl/g)=1.9.

EXAMPLE 14

A 915.0 gram sample of a 25.0 weight percent heptane solution of Composition A crude (228.7 grams) was washed with 46.0 grams of a solution containing 50 weight percent acetonitrile and 50 weight percent water. After standing for one hour the lower amber acetonitrile phase weighing 43 grams was removed. The heptane phase was then washed twice with 115 grams of water. The recovered aqueous layers weighed 120.9 grams and 120.0 grams, respectively. The heptane phase was divided into portions. Fraction A (431.8 grams) was stored at ambient temperature in a stoppered flask for 60 hours. Fraction B (467.3 grams) was combined with 5.0 grams of anhydrous $Na_2SO_4$ and stored at ambient temperature in a stoppered flask for 60 hours. After filtering $Na_2SO_4$ from Fraction B, solvent (80 grams) was distilled from each fraction through an 8-inch Vigreux Column (45° C. maximum pot temperature, 55 millimeters mercury). The warm concentrated cyclic enriched heptane solutions were filtered to remove cloudiness, and each solution was further concentrated to 50 weight percent using a rotary evaporator. The cyclic enriched chlorophosphazene was crystallized at 25° C. from heptane. Fraction A gave 60.5 grams of highly purified trimer and tetramer (48.6% yield) Viscosity (dl/g)=2.2, and Fraction B gave 72.8 grams of purified trimer and tetramer product (54.0% yield). Viscosity (dl/g)=1.7.

EXAMPLE 15

A 414.0 gram sample of a 25.0 weight percent heptane solution of crude chlorophosphazene (103.5 grams) comprising on a weight basis: 65.3% trimer; 13.2% tetramer; 5.8% pentamer; 2.6% hexamer; 1.3% heptamer; and 0.5% unknowns was washed with 210.0 grams of a solution containing 25 weight percent acetonitrile and 75 weight percent water. After standing for one hour, the lower amber acetonitrile phase weighing 20.5 grams was removed. The heptane phase was then washed twice with 52.5 grams of water. The weights of the recovered aqueous phases were 53.4 grams and 53.0 grams, respectively. The cyclic enriched heptane solution was then distilled at approximately 55 millimeter mercury using an 8-inch Vigreux Column with a final pot temperature reaching 45° C. About 80 grams of the charge was distilled and then fresh heptane was added to give a 25 weight percent solution. The cloudy solution was filtered through a medium porosity glass fritted funnel. The clear filtrate was stripped to a ratio of 1:1 chlorophosphazene/heptane on a rotary evaporator and the product was crystallized at 25° C. The white crystalline pure chlorophosphazene product weighed 46.0 grams. Yield was 45%. Viscosity (dl/g)=1.3.

I claim:

1. A process for improving the purity of phosphonitrilic chloride polymers which comprises the following steps:
    (1) contacting a mixture of open-chain phosphonitrilic chloride oligomers admixed with cyclic trimer, cyclic tetramer and higher cyclic oligomers of phosphonitrilic chloride with a normally liquid aliphatic hydrocarbon in an amount sufficient to extract a major portion of the cyclic oligomers, whereby a normally liquid hydrocarbon phase and a separate oil phase are formed;
    (2) removing the oil phase from the cyclic enriched hydrocarbon phase;
    (3) treating the hydrocarbon phase with aqueous lower alkylnitrile in an amount sufficient to extract substantially all of the entrained open-chain oligomers from the hydrocarbon phase into a separate aqueous phase thereby produced;
    (4) removing the aqueous phase from the hydrocarbon phase;
    (5) treating the hydrocarbon phase with water in an amount sufficient to extract a major portion of entrained alkylnitrile in the hydrocarbon phase into a separate aqueous phase;
    (6) removing the aqueous phase from the hydrocarbon phase;
    (7) drying the hydrocarbon phase;
    (8) removing the solvent from the hydrocarbon phase to yield a cyclic enriched mixture of cyclic trimer, cyclic tetramer and higher cyclic oligomers;
    (9) dissolving the cyclic enriched mixture of phosphonitrilic chloride oligomers in an inert organic solvent at a temperature sufficient to effect complete dissolution of the mixture therein; and
    (10) cooling the solution until a significant amount of highly purified cyclic trimer and cyclic tetramer separate from the solution.

2. A process for improving the purity of phosphonitrilic chloride polymers according to claim 1 wherein the amount of said aqueous lower alkylnitrile sufficient to extract substantially all of said open-chain oligomers entrained in said hydrocarbon layer is at least 5 weight percent based on the weight of said mixture of open-chain phosphonitrilic chloride oligomers admixed with said cyclic oligomers of phosphonitrilic chloride.

3. A process for improving the purity of phosphonitrilic chloride polymers according to claim 2 wherein the amount of said aqueous lower alkylnitrile is about 20 weight percent.

4. A process for improving the purity of phosphonitrilic chloride polymers according to claim 1 wherein said aqueous lower alkylnitrile comprises from about 25% by weight to about 90% by weight of lower alkylnitrile based on the total weight of said aqueous lower alkylnitrile solution.

5. A process for improving the purity of phosphonitrilic chloride polymers according to claim 4 wherein said lower alkylnitrile is acetonitrile.

6. A process for improving the purity of phosphonitrilic chloride polymers according to claim 1 wherein the solvent utilized in step (9) is independently selected from $C_5$–$C_9$ alkanes and mixtures thereof.

7. A process for improving the purity of phosphonitrilic chloride polymers according to claim 6 wherein said solvent is heptane.

8. A process for improving the purity of phosphonitrilic chloride polymers according to claim 1 wherein said aliphatic hydrocarbon is independently selected from $C_5$–$C_9$ alkanes and mixtures thereof.

9. A process for improving the purity of phosphonitrilic chloride polymers according to claim 8 wherein said hydrocarbon is heptane.

10. A process for improving the purity of phosphonitrilic chloride polymers according to claim 1 wherein said amount of hydrocarbon sufficient to extract a major portion of said cyclic polymers is an amount of about 2.5 to 4 times the weight of said mixture of open-chain phosphonitrilic chloride oligomers admixed with said cyclic oligomers of phosphonitrilic chloride.

11. A process for improving the purity of phosphonitrilic chloride polymers according to claim 1 in which a drying agent selected from the group consisting of sodium sulfate, calcium sulfate, magnesium sulfate and calcium chloride is utilized in step (7) in an amount ranging from about 1% to about 25% by weight based on the total weight of said mixture of open-chain phosphonitrilic chloride oligomers admixed with said cyclic oligomers of phosphonitrilic chloride.

12. A process for improving the purity of phosphonitrilic chloride polymers according to claim 1 wherein said solvent is removed in step (8) by depositing said hydrocarbon phase in an evaporator vessel and slowly heating said vessel from about room temperature up to a maximum temperature of about 60° C. while simultaneously lowering the pressure from atmospheric to approximately 1 mm. mercury over a period of time of approximately one hour.

13. A process for improving the purity of phosphonitrilic chloride polymers according to claim 1 wherein a temperature in the range of from about 60° C. to about 70° C. is utilized in step (9).

14. A process for improving the purity of phosphonitrilic chloride polymers according to claim 1 wherein said solution in step (10) is cooled to a temperature in the range of from about 25° C. to about 0° C. whereby a significant amount of highly purified cyclic trimer and tetramer separate from said solution.

15. A process for improving the purity of phosphonitrilic chloride polymers according to claim 1 wherein the solvent utilized in step (9) is a chlorinated hydrocarbon selected from the group consisting of monochlorobenzene, trichlorobenzenes, orthodichlorobenzene, carbon tetrachloride, chloroform, methylene chloride, sym-tetrachlorethane, and tetrachloroethylene.

16. A process for improving the purity of phosphonitrilic chloride polymers according to claim 1 including the additional step of recycling at least a portion of said solution from step (10) remaining after the separation of a significant amount of purified cyclic chlorophosphazene trimer and tetramer therefrom for reuse in the process.

17. A process for improving the purity of phosphonitrilic chloride polymers which comprises the following steps:
(1) contacting a mixture of open-chain phosphonitrilic chloride oligomers admixed with cyclic trimer, cyclic tetramer and higher cyclic oligomers of phosphonitrilic chloride with a normally liquid aliphatic hydrocarbon in an amount sufficient to extract a major portion of the cyclic oligomers, whereby a normally liquid hydrocarbon phase a separate oil phase are formed;
(2) removing the oil phase from the cyclic enriched hydrocarbon phase;
(3) treating the hydrocarbon phase with a solution of aqueous lower alkylnitrile in an amount sufficient to extract substantially all of the entrained open-chain oligomers from the hydrocarbon phase into a separate aqueous phase thereby produced;
(4) removing the aqueous phase from the hydrocarbon phase;
(5) treating the hydrocarbon phase with water in an amount sufficient to extract a major portion of entrained alkylnitrile in the hydrocarbon phase into a separate aqueous phase;
(6) separating the aqueous phase from the hydrocarbon phase;
(7) removing the solvent from the hydrocarbon phase by distillation to yield a cyclic enriched mixture of cyclic trimer, cyclic tetramer and higher cyclic oligomers;
(8) dissolving the cyclic enriched mixture of phosphonitrilic chloride polymers in an inert organic solvent at a temperature sufficient to effect complete dissolution of the mixture therein; and
(9) cooling the solution until a significant amount of highly pure cyclic trimers and cyclic tetramer separate from the solution.

18. A process for improving the purity of phosphonitrilic chloride polymers according to claim 17 wherein said aliphatic hydrocarbon is independently selected from $C_5$-$C_9$ alkanes and mixtures thereof.

19. A process for improving the purity of phosphonitrilic chloride polymers according to claim 18 wherein said hydrocarbon is heptane.

20. A process for improving the purity of phosphonitrilic chloride polymers according to claim 17 wherein the amount of said aqueous lower alkylnitrile sufficient to extract substantially all of said open-chain oligomers entrained in said hydrocarbon layer is at least 5 weight percent based on the weight of said mixture of open chain phosphonitrilic chloride oligomers admixed with said cyclic oligomers of phosphonitrilic chloride.

21. A process for improving the purity of phosphonitrilic chloride polymers according to claim 20 wherein the amount of said aqueous lower alkylnitrile is about 20 weight percent.

22. A process for improving the purity of phosphonitrilic chloride polymers according to claim 17 wherein said aqueous lower alkylnitrile comprises from about 25% by weight to about 90% by weight of lower alkylnitrile based on the total weight of said aqueous lower alkylnitrile solution.

23. A process for improving the purity of phosphonitrilic chloride polymers according to claim 22 wherein said lower alkylnitrile is acetonitrile.

24. A process for improving the purity of phosphonitrilic chloride polymers according to claim 17 wherein the solvent utilized in step (8) is independently selected from $C_5$-$C_9$ alkanes and mixture thereof.

25. A process for improving the purity of phosphonitrilic chloride polymers according to claim 24 wherein said solvent is heptane.

26. A process for improving the purity of phosphonitrilic chloride polymers according to claim 17 wherein said amount of hydrocarbon sufficient to extract a major portion of said cyclic polymers is an amount of about 2.5 to 4 times the weight of said mixture of open-chain phosphonitrilic chloride oligomers admixed with said cyclic oligomers of phosphonitrilic chloride.

27. A process for improving the purity of phosphonitrilic chloride polymers according to claim 17 wherein said distillation is carried out at a temperature ranging from about 25° C. to about 50° C. and at a pressure ranging from about 100 mm. mercury to about 1.0 mm mercury.

28. A process for improving the purity of phosphonitrilic chloride polymers according to claim 17 wherein a temperature in the range of from about 60° C. to about 70° C. is utilized in step (8).

29. A process for improving the purity of phosphonitrilic chloride polymers according to claim 17 wherein said solution in step (9) is cooled to a temperature of from about 25° C. to about 0° C. whereby a significant amount of highly purified cyclic trimer and tetramer separate from said solution.

30. A process for improving the purity of phosphonitrilic chloride polymers according to claim 17 wherein the solvent utilized in step (8) is a chlorinated hydrocarbon selected from the group consisting of monochlorobenzene, trichlorobenzenes, orthodichlorobenzene, carbon tetrachloride, chloroform, methylene chloride, sym-tetrachlorethane, and tetrachloroethylene.

31. A process for improving the purity of phosphonitrilic chloride polymers according to claim 17 including the additional step of recycling at least a portion of the solution from step (9) remaining after the separation of a significant amount of said purified cyclic trimer and tetramer therefrom for reuse in the process.

32. A process for improving the purity of phosphonitrilic chloride polymers which comprises:
(1) contacting a solution of open-chain phosphonitrilic chloride oligomers admixed with cyclic trimer, cyclic tetramer and higher cyclic oligomers of phosphonitrilic chloride in a normally liquid aliphatic hydrocarbon with aqueous lower alkylnitrile;
(2) separating the liquid hydrocarbon phase laden with cyclic trimer and some cyclic tetramer from the aqueous phase thereby produced; and
(3) recovering high purity cyclic trimer and cyclic tetramer from the hydrocarbon phase.

33. A process for improving the purity of phosphonitrilic chloride polymers according to claim 32 wherein said normally liquid aliphatic hydrocarbon is independently selected from $C_5$–$C_9$ alkanes and mixtures thereof;

34. A process for improving the purity of phosphonitrilic chloride polymers according to claim 33 wherein said hydrocarbon is heptane.

35. A process for improving the purity of phosphonitrilic chloride polymers according to claim 32 wherein said lower alkylnitrile is acetonitrile.

* * * * *